Figure 1:
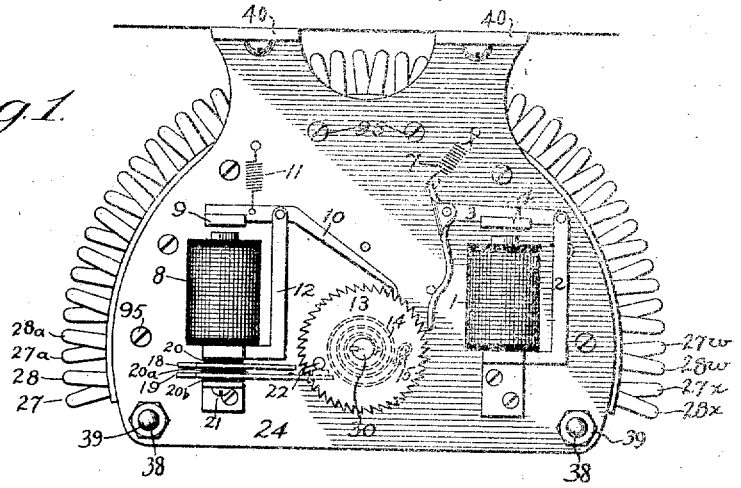

S. H. BROWNE.

TELEPHONE EXCHANGE SYSTEM.

APPLICATION FILED SEPT. 30, 1914.

Reissued Mar. 16, 1915.

13,891.

2 SHEETS—SHEET 1.

Witnesses:
Joseph A. Gately
Mary J. Daugle

Inventor:
Sidney H. Browne.
by Thomas S. Lockwood
Att'y.

S. H. BROWNE.

TELEPHONE EXCHANGE SYSTEM.

APPLICATION FILED SEPT. 30, 1914.

Reissued Mar. 16, 1915.

13,891.

2 SHEETS—SHEET 2.

Witnesses:
Joseph A. Gately
Mary J. Deagle

Inventor:
Sidney H. Browne.
by Thomas L. Lockwood
Att'y.

UNITED STATES PATENT OFFICE.

SIDNEY HAND BROWNE, OF SHORT HILLS, NEW JERSEY, ASSIGNOR TO AMERICAN TELEPHONE AND TELEGRAPH COMPANY, A CORPORATION OF NEW YORK.

TELEPHONE-EXCHANGE SYSTEM.

13,891. Specification of Reissued Letters Patent. Reissued Mar. 16, 1915.

Original No. 1,073,589, dated September 23, 1913, Serial No. 222,645. Application for reissue filed September 30, 1914. Serial No. 864,359.

*To all whom it may concern:*

Be it known that I, SIDNEY HAND BROWNE, a citizen of the United States of America, and resident of Short Hills, county of Essex, and State of New Jersey, have invented a new and useful Telephone-Exchange System, of which the following is a specification.

My invention relates to improvements in telephone exchange systems, and has for its object a quickening of the telephone service and a lowering of the cost of producing the telephone service through a decrease in the number of operators, or in the number of hours of their work, or both.

In telephone exchanges of the most general use, and recognized today to represent the best practice in producing telephone service, the subscriber signifies his desire to be connected with another line by removing his telephone receiver from its hook. This lights an incandescent lamp or sets some other form of visual signal before a certain operator in the central office, notifying her that she must connect her telephone with his line, and by conversation ascertain his desire, then connecting him with the line for which he calls. It is usual to provide each operator with a certain number of lines, from which she receives calls, and to give her access to all of the lines of the system directly, that she may connect the lines of her group of subscribers with them, or by means of a trunking system to give her similar access even though all the subscribers' lines do not appear before her. It is found that to give each operator a certain number of subscribers' lines which she shall answer, does not enable her to maintain an even rate of working, because some subscribers make many more calls in a day than do others; inventions have been made enabling the number of lines terminating before a given operator, to be increased or diminished from time to time in order that the position of the switchboard served by one operator may not demand more of her than she can perform, or demand so little as not to keep her busy. Such an ability to redistribute the lines is given by the device known as the "intermediate distributing board"; but even that has the disadvantage that it is only useful to make relatively permanent changes in the connections of the lines, and it has little usefulness unless the traffic produced by the various lines, individually and in groups, be studied for a considerable time so that it may be guessed what traffic they will produce in the future, and redistribution made accordingly. The intermediate distributing board when used thus in the best way of which it is capable, will not even up the traffic in such a way that each operator will be evenly busy throughout all the hours she is working, but will only prevent great inequalities among the operators at a given time. For example, during the busy hours of the day, the traffic of the office may be handled by a certain number of operators, each working to full capacity, and with practically identical loads for each; but in the less busy hours of the day the operators may be reduced in number, one of them serving two or three or more of the groups of lines served by an operator each during the busy hours; but at the best she can give prompt service only by serving such a group of lines as she can easily reach with her answering cords and plugs from a fixed standing or sitting position; if the traffic is so light that economy compels so small a number of operators as to give each of them a greater length of the switchboard to serve than she can handle without walking from one place to another to answer the calls, the quality of the service will suffer in that the calls will be answered less promptly.

My invention accomplishes the result of automatically distributing the calls upon the switchboard so that as many calls come to an operator's position as she can reasonably well handle, and they come with a much greater steadiness than is true under the present systems. This enables the total traffic to be handled by a minimum number of operators, insures that each call can be handled by an operator without her having to move from place to place to answer it, and accomplishes both economy in the expense of furnishing and uniform excellence in the character of the service.

I attain these objects by the circuits and mechanism illustrated in the accompanying drawings, in which—

Figure 1 is a plan view of a switch; Fig.

Figure 3:
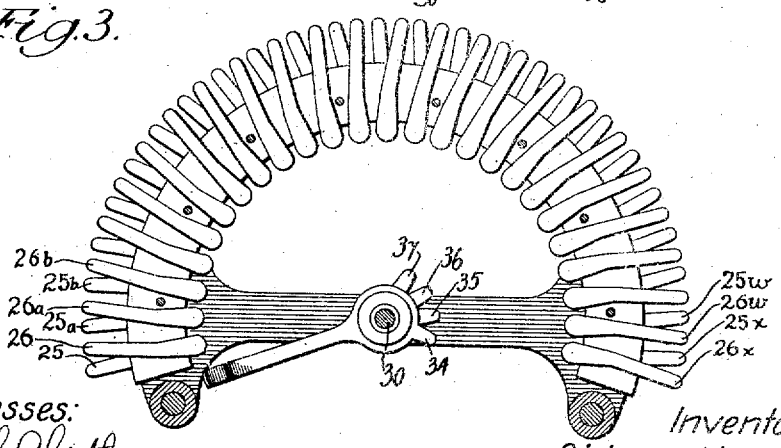
Figure 4:
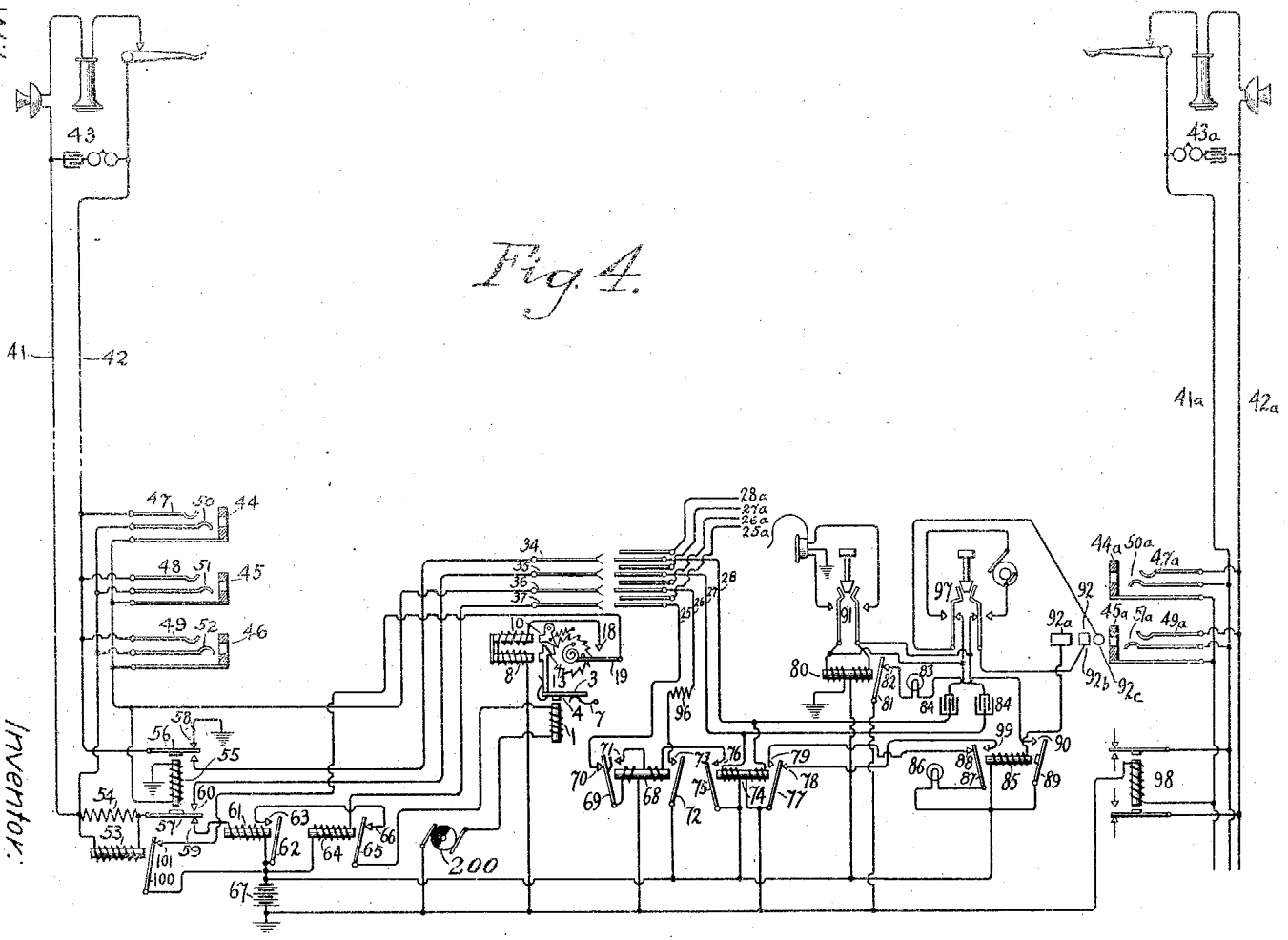

2, an elevation; Fig. 3, a horizontal section of that switch, and Fig. 4 is a scheme of the circuits.

Similar letters refer to similar parts throughout the several views.

Figure 2:
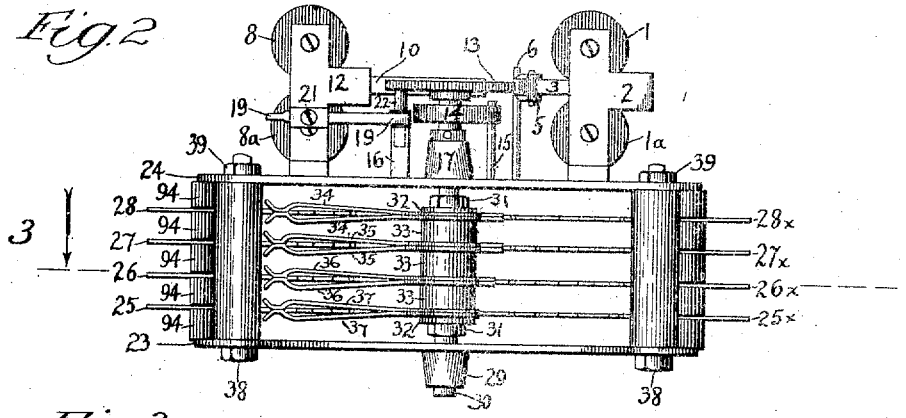

From Figs. 1, 2 and 3 I have omitted the many wires which are attached to the various electrical parts of the switch when it is connected for operation. In Fig. 4 these connections are shown for a switch, and the same circuit relations as are there shown will be repeated when a number of switches are connected to form a complete system. The plates, 23 and 24, having the lugs, 40, 40, formed from them for convenience in mounting the switch, are clamped together by the bolts, 38, and the nuts, 39. Contact pieces, 25, 26, 27 and 28, $25^{x}$, $26^{x}$, $27^{x}$ and $28^{x}$, with others quite similar, are arranged in four horizontal circular arcs between the plates 23 and 24; of these contact pieces, there are a number in each circular arc; in the form of switch which I show in these figures, there are twenty-five contact pieces in each arc, and each piece is brought out at the periphery of the circular portion of the switch so that a wire may be attached to it. Between each row of contact pieces and the neighboring row, between the upper row and the top plate, 24, and between the lower row and the bottom plate, 23, insulating material, 94, such as hard rubber or fiber, is clamped by the bolts, 38, and the screws, 95. This serves the double purpose of insulating the contact pieces from each other and from the framework, and holding all of them securely in position.

Plates, 24 and 23, have attached to them or formed from them respectively the bearing studs, 17 and 29. These guide and support the vertical shaft, 30, which carries on its upper end the ratchet wheel, 13, and which is adapted to be held in or returned to normal position by the action of the spiral spring, 14, attached to the shaft, 30, at one end, and to the pin, 15, at the other. The pin, 15, is carried by the top plate, 24. When the ratchet wheel, 13, is in its normal position, the pin, 22, engages the post 16; the pin, 22, also engages the contact spring 19, bending it out of contact with the contact piece, 18. The spring, 19, carries on its end an insulation to prevent electrical contact with the pin, 22. Spring, 19, and the piece, 18, are separated from electrical contact with each other and with the conducting part of the switch structure, by the insulating pieces, 20, $20^{a}$ and $20^{b}$, of rubber or other suitable material; they are bound to place by a screw, 21, bushed from contact with the spring and contact piece in a familiar manner and entering the bracket, 12. The bracket, 12, serves the double purpose of supporting the magnet coils, 8 and $8^{a}$, and of forming a part of the magnetic circuit of those coils; one end of this bracket forms a pivot with the arm, 10, adapted to form a retaining pawl for the ratchet wheel, 13. The helical spring, 11, is a retractile one, holding the pawl, 10, in engagement with a tooth of the ratchet wheel, 13, unless the iron armature, 9, is sufficiently attracted by the cores of the coils, 8 and $8^{a}$, when they are energized. Of similar structure is the magnet formed of the coils, 1 and $1^{a}$, the bracket, 2, the iron armature, 4, and the lever, 3, except that the latter carries a further pivoted part, 5; a helical retractile spring, 7, tends not only normally to hold the arm and armature, 3 and 4 respectively, away from the cores of the coils, 1 and $1^{a}$, but to keep the free end of the arm, 5, in engagement with the post, 6, carried by the top plate, 24. Unless the coils are energized, the free tip of the arm, 5, will be out of engagement with the teeth of the ratchet wheel, 13; but if the coils are energized, attracting the armature, 4, the motion of the arm, 5, will enable it, while still sliding in contact with the post, 6, to engage a tooth of the ratchet wheel, 13, and advance it one step; the wheel will then be held by a new engagement of the pawl, 10, against a tooth. When the cores, 1 and $1^{a}$, are deënergized, the tip of the arm, 5, will again pass out of engagement with the ratchet wheel, 13, and successive impulses of current will advance the ratchet wheel step by step, carrying with it the shaft, 30. The relation between the teeth of the ratchet wheel and the contact pieces, 25, $25^{a}$, $25^{x}$, and the similar contact pieces in the other three rows, is such that for each advance of the ratchet wheel one step, the contact wipers, 34, 35, 36 and 37, will engage the different contact pieces of the rows successively; the contact wipers, 34 to 37 inclusive, are in pairs, the two members of each pair being in electrical contact, but each pair being insulated from the shaft and other conducting parts of the structure by insulating bushings, 32, 33, adapted not only to bind and to space the contact wipers, but to center them also in a well-known manner. The ends of the contact wipers which do not engage the contact pieces, are adapted to receive flexible conductors making continual connection with the contact wipers during a movement through the whole arc.

The normal position of the contact wipers is out of engagement with any contact piece; one step of the ratchet wheel, 13, causes them to make contact respectively with the first contact pieces in the rows, and successively, impulse by impulse, to the end of the arc. As shown most clearly in Fig. 3 each contact wiper, in moving from one contact to another, will engage the next following contact before leaving the preceding one. The actuation of the magnets, 8 and $8^{a}$, at any time, will release the ratchet wheel, 13, unless the magnets, 1 and 1ᵃ, are also energized; upon such release the contact wipers return to normal position, out of engagement with any contact pieces, and the connection between the spring, 19, and the contact piece, 18, is broken, although it had been made during all the time the contact wipers were not in their normal position.

Referring to Fig. 4, the line formed of conductors, 41 and 42, connects the subscriber's instrument, 43, with the mechanism of the central office. The subscriber's instrument is of a type adapted for use with central energy systems, and is one in which the line circuit is open to direct current unless the receiver is off the switch hook. It will be seen that the subscriber's line, in the central office, is associated with a number of electrical devices, and may be considered as a unit with the elements of a circuit broadly considered to terminate in the contact wipers, 34, 35, 36 and 37. Another group of devices may be considered as a unit, and as beginning in the drawing at the contact pieces, 25, 26, 27 and 28, (the numbers, for clearness in the drawing, being located contiguous to wires connecting with those contact pieces), and extending to include the plug 92. The drawing shows further at the right, a subscriber's instrument and line, similar to that first mentioned, but from which the details not essential to this specification have been omitted.

Considering first the character and functions of the mechanism associated with the line, 41 and 42: It is provided with multiple jacks, three of which are shown in Fig. 4, each having the elements of two line springs and a test ring, respectively 47, 50 and 44; 48, 51 and 45; 49, 52 and 46. Similar springs in each jack are connected to one side of the line, and this is true whatever may be the number of spring jacks required for each line in a given system. The test rings of all the jacks of a line are connected together and to the winding of the cut-off relay, 55, the other end of that winding being connected to ground. Under normal conditions this relay is not energized, so that its armature, 56, will make contact with the grounded point, 58, and its armature, 57, will make contact with the point, 59, establishing thence a circuit from the line wire, 41, through the relay, 53, to another relay, 61, and the battery, the remaining pole of which is grounded. The relay, 53, is preferred to be shunted by the non-inductive resistance, 54, so proportioned as to allow the relay to be operative through the proper margins of voltage and line resistance, and yet to enable voice currents to pass through the non-inductive resistance as well as through the impedance of the relay winding. A relay, 64, has its winding in a connection between the free pole of the battery and the contact wiper, 37. The normally closed contact between its armature, 65, and point 66, serves to maintain a circuit such that if the relay, 61, should be energized, closing its armature, 62, upon the point, 63, the interrupter, 200, kept constantly rotating at the proper rate, will serve to cause impulses of current through the path described, and the switch winding, 1; the switch winding, 1, is that which has been described with reference to Figs. 1, 2 and 3, as adapted to rotate the contact wipers, 34, 35, 36 and 37, and with the conditions which I have described, such rotation would be caused to begin immediately upon the subscriber's removing his telephone receiver from the hook to make a call. It is my intention that this shall be the result, and that when such rotation begins it shall continue through the arc of the subscriber's rotary switch until, in making successive contacts, a position is found connecting the subscriber's line with a set of four contact pieces leading into a plug-terminated circuit upon which, at that moment, no other subscriber's line is connected. I have shown that each subscriber's switch has many sets of four trunk contacts each; and these are as many points of access to plug-terminated trunks.

In Fig. 4, I indicate the existence of a plurality of possible trunks to be selected, by showing not only the contact pieces, 25, 26, 27 and 28 as one trunk, but 25ᵃ, 26ᵃ, 27ᵃ and 28ᵃ, as illustrative of other trunks. During the period, therefore, which succeeds the removal of the subscriber's receiver from its hook, the rotation will continue as long as the circuit through the magnet, 1, remains as first established. When in the successive steps the contact wiper, 37, engages a contact, as 25, which is grounded through the back contact of the armature, 69, upon its point, 70, of the relay, 68, further rotation will be stopped because so finding a ground by the contact wiper, 37, will energize the relay, 64, of the line, causing its armature to break its back contact. As this breaking prevents further rotative impulses, the switch will remain upon the contact pieces of that trunk, selecting it as an extension of the subscriber's line to the operator's position upon which are located the trunk signals and other trunk mechanisms yet to be described. As a further result of the finding of the grounded contact piece, 25, by the contact wiper, 37, the relay, 68, will be energized and its armature, 69, will make contact with the forward point, 71, and afterward will break the back contact with the point, 70. Simultaneously, also, the armature, 72, of the same relay will make contact with the point, 73, causing current from the battery to flow through the resistance, 96, the contact piece, 26, the contact wiper, 36, to and through the winding of the cut-off relay, 55, to ground. The cutoff relay, operating, will break the contact of its armature, 56, from ground and apply it to the conductor leading immediately to the contact wiper, 34; similarly it will break the contact of its armature, 57, from the relay, 61, and apply it to the contact, 60, leading directly to the contact wiper, 35. The effect is to extend the line immediately through the contact wipers mentioned to the line conductors of the trunk, terminating in an operator's position. A further effect is to release the previously closed contact of the relay, 61, preventing a renewed rotation of the subscriber's switch which would otherwise occur.

The resistance 96 operates to reduce the current from battery 67 through the cut-off relay 55 to approximately such a volume as the cut-off relay 55 would receive from a plug inserted in one of the multiple jacks 44—45—46, and thus to give a busy test condition to the multiple jacks similar to the condition placed upon those jacks by the insertion of a connecting plug in one of them. It will be noted also that when the switch of a calling line is connected temporarily with a busy trunk while passing that trunk in its search for an idle trunk, the cut-off relay associated with the seeking switch is placed in shunt with the cut-off relay associated with the switch which is holding that trunk busy; the resistance 96 in series with the two relays thus in shunt reduces the current through both of them to such a volume as will not actuate the relay 55 associated with the seeking switch yet will retain in its actuated condition the relay 55 associated with the switch which is holding the trunk busy, and will also be sufficient to place a busy potential upon the multiple jacks of the calling line. It may be noted here that the action of shunting the cut-off relay of the line holding the tested trunk is similar to the shunting of that relay when its multiple jacks are tested by the tip of a testing plug. The subscriber's line now being extended into the line conductors of the plug-terminated trunk, the relay, 74, whose winding is bridged across the line conductors of the trunk, and in series with the battery, will be operated. One of the effects is to close the armature, 75, upon its contact 76, connecting the two windings of the relay, 68, in series with the battery and earth, thus holding it energized. The other armature, 77, of the relay, 74, leaves point, 78, and engages point, 79, lighting the signal lamp, 86, because the back contact of the armature, 87, of the relay, 85, is closed. This lighting is a signal to the operator in charge of that trunk, that a call requires to be answered; this she does, by actuating her listening key, 91, in the usual manner, after which, in conversation with the subscriber, she determines his wants, lifts the trunk plug, 92, tests the multiple jack of the called line, inserts the plug in the jack if the line proves not to be busy, and rings the called subscriber's bell by means of the ringing key, 97, or other equivalent mechanism, such as an automatic arrangement for establishing conditions to ring his bell until he responds.

The act of inserting the trunk plug, 92, in the jack of the line of a called subscriber, not only connects the calling and the called lines in readiness for talking when the called subscriber answers, but connects the battery through the winding of the relay, 85, and the sleeve, $92^a$, of the trunk plug through the test ring of the jack with the winding of the cut-off relay, 98, belonging to that line, and through that winding to ground. Thus the cut-off relay, 98, is operated, disconnecting the called line from connection with its own rotary switch and associated relays, so that the answering of the called subscriber will not cause any operation of those parts of the equipment of his line in the central office. The relay, 85, also operates, breaking the contact between one of its armatures, 87, and its back contact, 88, and extinguishes the signal lamp which caused the operator to answer in the first place; the armature, 87, closes on its front contact, 99, remaining there during all the time the trunk plug is in connection; the armature, 89, of the relay, 85, closes on its front contact, 90, lighting the signal lamp, 83, through the connection between the back contact, 82, and armature, 81, of the relay, 80. When the called subscriber answers, removing his receiver from its hook, the relay, 80, is energized. Its winding is bridged across the line at a point between the condensers, 84, 84, and the inner contacts of the ringing key, 97, and is also in series with the battery. The armature, 81, thus loses contact with the point, 82; lamp, 83, is extinguished, notifying the operator that further ringing on her part is unnecessary. It is obvious that if the ringing key, 97, were an automatic one, ringing until the subscriber should answer, this function of the lamp 83, would be unnecessary, and such an arrangement of my circuit might be made with advantage. Under the conditions which I have described, conversation may progress between the two subscribers.

At the close of the conversation, the hanging up of his receiver by the calling subscriber, permits the relay, 53, to deënergize, allowing its armature, 100, and back contact, 101, to connect. Because the contact between spring, 19, and point, 18, of the rotary switch, had been made since the first step of the mechanism, this falling away of the armature of the relay, 53, occurring for the first time since the beginning of the entire cycle of events, will cause the battery to energize the windings, 8, of the release magnets. The pawl, 10, drawing out of the ratchet wheel, 13, will allow the switch to return to its normal position, again breaking contact between spring, 19, and contact, 18. It is thus evident that the hanging up of the telephone of the calling subscriber at the close of the conversation, accomplishes immediate disconnection, and that upon again removing his receiver from the hook, the rotation of the switch will be repeated.

Because of the immediate release of the rotary switch and its return to a normal position, the relay, 74, will be deënergized; because the trunk plug is still in position and the contact made between armature, 87, and point, 99, of the relay, 85, the falling back of the righthand armature of the relay, 74, will make connection between its armature, 77, and the contact point, 78, relighting the lamp, 86. This is again a signal to the operator that the trunk requires attention, but because it is in use she understands the signal to mean that disconnection is desired, which act she then performs. The hanging up of the telephone on the part of the called subscriber, will release the relay, 80, closing its back contact, and relighting the signal lamp, 83, also serving as a disconnect signal to the operator in case she had not alreadey obeyed the previous signal due to the disconnection of the rotary switch.

The described result of immediate disconnection upon pulling down the hook at the calling station, gives further clearness to my statement that the operation of my system accomplishes an improvement in the quality of the service due to speed. It is evident that a subscriber, concluding a conversation, and desiring another connection, has only to hang up his receiver for an instant, or what is equivalent, pull down the hook and let it up again, whereupon his rotary switch will immediately select another idle trunk.

Inasmuch as the equipment of each subscriber's line includes in the central office not only the mechanism of the rotary switch and the relays associated with it, but also a series of multiple jacks distributed before the operators, it is necessary that busy test features be provided for. I show in Fig. 4 that the operator's telephone is adapted to such a busy test, and that it will be received whenever there is existent at the test rings of the spring jacks a difference of potential with relation to the earth. There are two ways whereby this busy test potential is placed upon the test rings; one is the result of the presence of the trunk plug in one of the jacks of the line, and the other is a result of the engagement of contact wiper 36 with trunk contact 26 of the first trunk reached by the line wipers in hunting for an idle trunk. If this first trunk is idle the busy potential is placed upon the test rings immediately trunk relay 68 pulls up its armature 72 and closes, at contact 73, the circuit including resistance 96. On the other hand if the first trunk is already in use, its relay 68 will of course be energized and, although the progressively advancing line wipers will not be arrested, busy potential will be placed upon the test rings of the calling line during the short time wiper 36 remains in engagement with contact 26 of said trunk and such busy potential will be maintained without interruption as each succeeding contact 26 of a busy trunk is engaged. This follows since, as shown clearly in Fig. 3, the movable line wipers are of such width that they engage the next succeeding contact before breaking contact with the one preceding it. Thus it will be seen that even though all the trunks in the system are busy, except the one whose contacts are the last in the series to be reached by the movable wipers, nevertheless busy potential will be continuously applied to the test rings of the calling line, from the time the first trunk is engaged until said idle one is found, and of course will be maintained during the time the calling line remains connected with said trunk, or in other words, until the calling subscriber hangs up his receiver. Consequently, there is practically no time during which a subscriber's line, engaged either as a calling or called line, is left unguarded.

In the practical arrangement of the various subscribers' switches with relation to the trunks to the operators, I prefer to terminate in each operator's position such a number of trunks as when continuously occupied by successive conversations, will furnish an amount of work which the operator can just successfully perform. The number of these trunks per position depends upon the length of time of the average conversation, as well as upon the ability of the operators, but probably will be approximately ten.

The rotary switch for each subscriber's line has twenty-five sets of stationary contacts, according to the structure shown in Figs. 1, 2 and 3. Each of these twenty-five sets of contacts forms a terminal for a trunk line, as shown clearly in Fig. 4; and in order to give a number of subscribers' lines access to the same trunk line, I multiple the trunk lines through the corresponding stationary contact points on the rotary switches in much the same manner as is followed in the ordinary multiple switchboard of modern practice, wherein a subscriber's line is multipled to a separate jack on every section of the switchboard. Each rotary switch will thus afford the subscriber to which it belongs, access to twenty-five trunk lines, if the switches are constructed as here shown. Of course each switch may be made to afford access to a greater or less number of trunks if desired, by giving each rotary switch a greater or less number of contacts. Where there is such a number of subscribers' lines as would require, at the time of maximum traffic, a greater number of trunk lines than there are contacts upon any switch, it would become necessary to divide the subscribers' lines into groups, there being as many lines in each group as would be likely to keep busy, at the time of maximum traffic; the number of trunk lines for which terminals are afforded on each switch. To make this clear, if the switches used have twenty-five sets of contacts each, and if there were centered in the office as many subscribers' lines as would require the use of say fifty trunks, then the subscribers' lines would be divided into two groups, each group being served by twenty-five trunks. All of the corresponding contacts on the switches of any one group would be multipled together and connected to the wires of one trunk line, as has already been pointed out.

The movable contacts on the selecting switch may properly be termed "selecting contacts" since they are actively involved in establishing a connection between a line and a trunk. Similarly the stationary contacts, such as 25, 26, 27 and 28, may be termed "waiting contacts", since they are passive and remain in position to be engaged by the selecting contacts. These waiting contacts may also be termed "multiple contacts", since the corresponding contacts on the switches of a group of lines are multipled together in a similar manner, to the multipling of the jack contacts in a multiple board.

The movable parts of the selecting switch form what may be termed a "flexible terminal" for a line, and I do not wish to be limited in all cases to any particular form of flexible terminal, as I believe that any form of mechanically actuated flexible terminal, or selecting switch, whether moving in a circular or straight path, and whether moved a step at a time, or by steady and continuous movement will, if used for the purposes herein outlined, lie within the scope of my invention. Neither do I wish to limit myself in all respects to the exact construction of other apparatus, nor to the exact arrangement of circuits here shown, as many modifications might be made therein without departing from the spirit of my invention.

Having thus described my invention, what I desire to claim and secure by Letters Patent, is:

1. In a telephone system, a substation, a telephone line extending in two limbs from said substation to a central office, a plurality of trunks, contacts therefor, a trunk hunting selecting switch for the line, wipers for said switch which successively engage the contacts of said trunks, a relay having contacts for maintaining said wipers disconnected from said line limbs during trunk hunting and for connecting said line limbs to said wipers when an idle trunk is found.

2. In a telephone system, a line, a source of current normally connected therewith for use in initiating a call, a trunk hunting line switch having trunk contacts and progressively advancing wipers which normally occupy a position out of engagement with said trunk contacts, a cut-off relay for the line for maintaining the line disconnected from said wipers during trunk hunting, means for actuating said cut-off relay, when said line is either a calling or a called line, to interrupt the normal connection of said line with its source of current and to connect the line with its wipers.

3. In a call distributing system, a telephone line, a source of current normally connected therewith, a plurality of trunks, an automatic selecting switch for connecting said line with an idle one of said trunks when a call is initiated, contacts in said switch for said line, other contacts for said line, a terminal for each of said trunks for use in connecting with said other contacts when the line is to be called, and a cut-off relay for maintaining the line disconnected from its switch contacts during the selecting operation of the latter, for connecting said line with its switch contacts when an idle trunk is selected, and for disconnecting the line from said source when said line is connected with as a called line through one of its other contacts.

4. In a telephone system, a subscriber's telephone, a line leading thereto, a cut-off relay and a line relay for the line, a source of current connected in bridge of said line through normal contacts of said cut-off relay, a plurality of trunks, movable wipers associated with said line connected to normally open contacts of said cut-off relay, means at the subscriber's telephone for serially including both limbs of the telephone line in circuit with said source and said line relay to actuate the latter, means controlled by the initial actuation of the line relay for automatically advancing said wipers into successive engagement with said trunks, means to stop said wipers upon an idle trunk, and means to actuate said cut-off relay to disconnect said source from the line and to connect the line with said wipers after the latter have engaged the contacts of an idle trunk.

5. In a telephone system, a telephone line extending in two limbs to a central office, wipers associated therewith, a plurality of stationary contacts, trunk lines extending from said contacts, means for automatically progressively advancing said wipers over said contacts until an idle trunk is found, a source of current normally bridged between the limbs of said line but disconnected from said wipers, a current supply bridge between the limbs of each of said trunk lines, a cut-off relay operated upon the selection of an idle trunk to interrupt the normal connections of said source with the limbs of the line and connect the line through its wipers with the current supply bridge in the selected trunk.

6. In a telephone system, a telephone line, a line relay therefor, a test relay, a plurality of trunks, contacts therefor, wipers associated with said line, motor means for progressively advancing said wipers over said trunk contacts, a circuit controlled by said line relay to cause the operation of said motor means and by said test relay to stop the operation of said motor means when a wiper connects with an idle trunk, a cut-off relay operated upon connection with an idle trunk to open the normal connection of said line relay and complete circuit between said line and idle trunk, and means for thereafter interrupting the circuit of the test relay.

7. In a telephone system, a telephone line, a source of current normally bridged between the limbs of said line, a line relay, wipers associated with said line, a plurality of stationary contacts, trunk lines extending from said contacts, means for automatically progressively advancing said wipers until an idle trunk line is found, an operating circuit for said means controlled by said line relay to cause the advance of said wipers, a test relay controlling said operating circuit to stop the advance of said wipers when an idle trunk is found, and a cut-off relay operated upon the selection of an idle trunk to interrupt the normal connections of said source with the limbs of the line and connect the line through its wipers with the selected trunk.

8. In a telephone system, the combination with electrically actuated trunk selecting switches, multipled contacts for said switches, a plurality of trunk lines terminating on said contacts, subscribers' stations, subscribers' lines, each extending in two limbs to a central office, a set of progressively traveling wipers for each of said selecting switches each set individual to a single subscriber's line, a source of current, a line relay, a cut-off relay for each line having contacts normally serially included in circuit with its associated line relay and which maintains the limbs of the line disconnected from its associated wipers during trunk hunting, an operating circuit for each selecting switch completed by the actuation of its line relay when the limbs of its line are closed together at the substation, a test relay for each selecting switch responsive to the idle condition of a trunk line for opening the operating circuit of its selecting switch, a test circuit for each test relay including a wiper of its selecting switch and a test contact of a trunk, a relay associated with each trunk for removing the idle condition from its test contacts when said trunk is selected, a circuit for each cut-off relay including a wiper of its selecting switch and a contact of a trunk, closed upon selection of an idle trunk by a calling line to energize the cut-off relay thereof, thereby extending the limbs of that line through their associated wipers to said idle trunk line and opening the normal circuit of the line relay of said calling line, a branch from each cut-off relay circuit, multiple contacts of a subscriber's line included in said branch, and means for completing the circuit of a cut-off relay over its branch when a line is connected with as a called line at one of its multiple contacts thereby opening the normal circuit of its line relay to prevent it from starting its line selecting switch into operation when the limbs of the line are closed together in answering a call.

9. In a telephone system, a subscriber's line extending in two limbs to a central office, multiple jacks for said line, a trunk hunting selecting switch for said line, waiting contacts for said selecting switch pertaining to a plurality of trunk lines leading from said switch, wipers for said switch, a cut-off relay for said line, which, when energized, connects the limbs of said line with wipers of said selecting switch, a circuit for the coil of said cut-off relay including a wiper and having a branch extending to the test contacts of said multiple jacks, means to place a test potential upon said multiple jacks during the selective movement of said wiper insufficient for the operation of said cut-off relay and to increase said test potential sufficient for the operation of said cut-off relay when said wiper arrives upon the contact of an idle trunk.

10. In a telephone system, a subscriber's line, multiple jacks for said line, a trunk hunting selecting switch for said line, waiting contacts for said selecting switch pertaining to a plurality of trunk lines leading from said switch, wipers for said switch, a cut-off relay for said line, a circuit for the coil of said cut-off relay including one of said wipers and having a branch extending to the test contacts of said multiple jacks, means to place a test potential upon said multiple jacks during the selective movement of said wiper insufficient for the operation of said cut-off relay and to increase said test potential sufficient for the operation of said cut-off relay when said wiper arrives upon the contact of an idle trunk, and a normal source of current disconnected from said line by the operation of said cut-off relay.

11. In a telephone system, a substation, a telephone line extending in two limbs from said substation to a central office, a source of current normally connected in bridge of said line, a line relay for said line, a plurality of connecting circuits, an automatic selecting switch for connecting said line with an idle one of said connecting circuits, means responsive to the energization of the line relay upon closing together the limbs of the line at the substation for initiating the progressive advance of said automatic selecting switch, and means for placing a busy potential upon the multiple jacks of said line during said advance movement and while said line is in circuit with a selected one of said trunks.

SIDNEY HAND BROWNE.

Witnesses:

GEORGE W. MCRAE,

WILLIAM C. OAKES.